US011448095B2

(12) United States Patent
Cortequisse

(10) Patent No.: US 11,448,095 B2
(45) Date of Patent: Sep. 20, 2022

(54) TURBINE ENGINE OIL TANK, METHOD FOR MEASURING LEVEL, AND COMPUTER PROGRAM

(71) Applicant: SAFRAN AERO BOOSTERS SA, Herstal (BE)

(72) Inventor: Jean-François Cortequisse, Herstal (BE)

(73) Assignee: SAFRAN AERO BOOSTERS SA, Herstal (BE)

(*) Notice: Subject to any disclaimer, the term of this patent is extended or adjusted under 35 U.S.C. 154(b) by 378 days.

(21) Appl. No.: 16/644,436

(22) PCT Filed: Apr. 17, 2019

(86) PCT No.: PCT/EP2019/059959
§ 371 (c)(1),
(2) Date: Mar. 4, 2020

(87) PCT Pub. No.: WO2019/202013
PCT Pub. Date: Oct. 24, 2019

(65) Prior Publication Data
US 2020/0217219 A1 Jul. 9, 2020

(30) Foreign Application Priority Data
Apr. 19, 2018 (BE) .................................. 2018/5258

(51) Int. Cl.
*F01D 25/18* (2006.01)
*F01D 21/00* (2006.01)
(Continued)

(52) U.S. Cl.
CPC ........... *F01D 25/18* (2013.01); *F01D 21/003* (2013.01); *F02C 7/06* (2013.01);
(Continued)

(58) Field of Classification Search
None
See application file for complete search history.

(56) References Cited

U.S. PATENT DOCUMENTS 4,683,718 A * 8/1987 Larsson .................. F03B 15/14
415/24
5,578,997 A * 11/1996 Lechevalier ........... F01M 11/10
340/591

(Continued)

FOREIGN PATENT DOCUMENTS

EP 3282104 A1 2/2018
FR 3036792 A1 12/2016

OTHER PUBLICATIONS

International Search Report dated Jun. 11, 2019 for Parent PCT Appl. No. PCT/EP2019/059959.

*Primary Examiner* — Michael Lebentritt
(74) *Attorney, Agent, or Firm* — James E. Walton

(57) ABSTRACT

The invention relates to a tank (32) for liquid, in particular of a turbine engine such as an aircraft turbojet engine, the tank comprising an external wall (36) with an inner surface (48); an inner chamber intended for containing the liquid of the tank (32) and defined by the inner surface of the external wall; and a system (42) for measuring the level of liquid. The system comprises: a submersible portion matching the inner surface of the wall (36); a clearance (52) separating the submersible portion from the inner surface; and a liquid detector (54) configured to emit a signal towards the submersible portion through the clearance, said signal being configured to be modified in the event that liquid is present in the clearance (52). The invention likewise relates to a method for measuring a level of liquid, and an associated computer program.

17 Claims, 4 Drawing Sheets

(51) Int. Cl.
*F02C 7/06* (2006.01)
*F16N 19/00* (2006.01)

(52) U.S. Cl.
CPC .... *F05D 2220/323* (2013.01); *F05D 2260/80* (2013.01); *F05D 2260/98* (2013.01); *F16N 19/003* (2013.01); *F16N 2210/08* (2013.01); *F16N 2250/18* (2013.01)

(56) References Cited

U.S. PATENT DOCUMENTS

| | | | |
|---|---|---|---|
| 10,072,569 B2 * | 9/2018 | Suciu | F02C 7/12 |
| 2003/0099538 A1 * | 5/2003 | Liu | F01D 25/183 |
| | | | 415/111 |
| 2013/0068562 A1 * | 3/2013 | Cornet | F16N 29/04 |
| | | | 701/100 |
| 2015/0362350 A1 | 12/2015 | Miller et al. | |
| 2018/0156066 A1 * | 6/2018 | Chalaud | F01D 25/18 |
| 2018/0321073 A1 * | 11/2018 | Cleyet | B64D 37/04 |
| 2021/0156726 A1 * | 5/2021 | Gebhard | G01F 23/76 |
| 2021/0164357 A1 * | 6/2021 | Felske | F01D 9/041 |

\* cited by examiner

TURBINE ENGINE OIL TANK, METHOD FOR MEASURING LEVEL, AND COMPUTER PROGRAM

TECHNICAL FIELD

The invention relates to the field of level estimation of liquid in a vehicle and/or turbomachine tank. The invention also relates to an axial turbomachine, in particular an aircraft turbojet or an aircraft turboprop. The invention also relates to a method for measuring the level of liquid in a tank provided with a wall.

BACKGROUND ART

The knowledge of the quantity of oil contained in a turbojet tank during a flight makes it possible to anticipate certain critical situations. In fact, the detection of an abnormally low level indicates a probability of an upcoming failure. In order to retrieve the information related to the quantity of oil available, the oil tanks are provided with electrical devices allowing an automatic reading of the oil level.

Patent document EP 3 282 104 A1 discloses a turbomachine tank such as an aircraft double-flow turbojet engine. The tank makes it possible to store a lubrication liquid useful for the operation of the turbomachine. The tank has: an inner chamber receiving the liquid of the tank; a wall with an inner surface surrounding the inner chamber; and a capacitive device for measuring the level of the liquid. The capacitive device comprises at least one electrode, possibly two electrodes forming the internal surface and intended to be in electrical contact with the liquid so as to measure the level thereof capacitively. However, the measurement accuracy remains perfectible.

The document FR 3 036 792 A1 describes another example of an oil tank.

SUMMARY OF THE INVENTION

Technical Problem

The object of the invention is to solve at least one of the problems posed by the prior art. More specifically, the invention aims to improve the accuracy and reliability of level measurement of a tank containing liquid. The invention also aims to provide a solution that is simple, resistant, lightweight, economical, easy to produce, convenient to maintain, and easy to inspect.

Technical Solution

The subject of the invention is a tank for liquid, in particular for a turbomachine such as an aircraft turbojet engine, the tank comprising an external wall with an internal surface and an external surface; an inner chamber intended to contain the liquid of the tank and delimited by the internal surface of the external wall; a liquid level measurement system; remarkable in that the measurement system comprises: a submersible portion conforming to the internal surface of the wall; a clearance separating the submersible portion from the internal surface; and a detector of liquid configured to emit a signal to the submersible portion through the opening, said signal being configured to be modified in the event of the presence of liquid in the opening.

According to preferred embodiments of the invention, the tank may include one or more of the following features, taken in isolation or according to all technically possible combinations:

The submersible portion comprises an external side turned towards the wall and generally matching the internal surface, said side comprising a surface with bumps protruding towards the external wall and recesses communicating with the clearance.

The depth of the recesses and the height of the bumps; in particular measured along the thickness of the clearance; are greater than the width of the recesses and the width of the bumps.

The clearance includes two opposite openings communicating with the inner chamber.

The submersible portion comprises a body with a first branch in contact with the external wall, said body forming the submersible portion.

The submersible portion has studs arranged in a grid pattern and extending towards the internal surface of the external wall.

The wall and the submersible portion are metallic, and the clearance forms an air-gap between the portion of the internal surface.

The detector of liquid includes an acoustic source and a microphone.

The signal is a sound signal emitted by the acoustic source through the external wall towards the submersible portion, and the microphone is able to perceive through the external wall the sound signal after reflection against the submersible portion.

The detector of liquid comprises a source generating the signal and arranged outside the external wall, in particular against the external surface.

The detector of liquid comprises a source of electrical voltage capable of applying a difference in electrical potential between the external wall and the submersible portion, the signal being said difference in electrical potential.

The detector of liquid is of the capacitive type, and configured to measure the electrical capacity of the clearance.

The external wall includes a pocket in which the detector of liquid is arranged.

The detector of liquid is pressed against the external surface of the external wall.

The submersible portion and the external wall are integrally made.

The detector of liquid, the clearance, and the submersible portion form a first module, the level measurement system further comprising a plurality of modules similar or identical to the first module.

The clearance passes through the measuring system.

The submersible portion has an area close to the wall and/or an area with roughness, the clearance being delimited by said area close to the wall.

The acoustic source and the microphone are arranged outside the external surface.

The submersible portion forms a comb, or has a comb-like outline.

The detector of liquid is able to cooperate with the submersible portion of liquid through the clearance.

The clearance communicates hydraulically with the inner chamber.

The submersible portion is placed in the inner chamber.

The submersible portion is intended to bathe in the liquid depending on the level of said liquid.

The thickness of the clearance is between: 3 cm and 1 mm, or between 2 cm and 5 mm, or between 1 cm and 3 mm.

The bumps and the recesses form an alternation.

The submersible portion includes a side with waves in contact with the clearance.

The clearance includes at least one opening communicating with the inner chamber.

The body has a second branch in contact with the outer wall.

The invention also relates to a turbomachine, in particular an aircraft turbojet engine capable of operating with negative vertical acceleration, comprising a tank for liquid, remarkable in that the tank for liquid conforms to the invention, preferably the liquid is oil.

The invention also relates to a process for measuring the level of liquid in a tank, in particular an oil tank, the process comprising the following steps: (a) filling the tank with the liquid; (b) measuring the level of liquid in the tank via the level measurement system; remarkable in that the system comprises: a submersible portion facing the internal surface of the wall; a clearance separating the submersible portion from the internal surface; and a detector of liquid; and wherein during step (b) measurement, the detector of liquid generates a signal through the clearance, respectively of the liquid in the presence of said liquid in the clearance, the liquid being able to modify the signal when said signal crosses said clearance; the tank for liquid being in particular in accordance with the invention.

According to a preferred embodiment of the invention, the submersible portion is produced by an additive manufacturing technology.

According to a preferred embodiment of the invention, during step (b) measurement, the temperature of the liquid is greater than 100° C., or greater than or equal to 200° C.

The subject of the invention is also a computer program remarkable in that it includes instructions, which, when the program is executed by a computer, lead the latter to implement the steps of the liquid level measurement method according to the invention.

In general, the preferred modes of each object of the invention are also applicable to the other objects of the invention. Each object of the invention can be combined with the other objects, and the objects of the invention can also be combined with the embodiments of the description, which in addition can be combined with one another, according to all possible technical combinations, unless the opposite is explicitly mentioned.

Benefits

The detection technique provides improved reliability for the detection of liquid at a given location. In addition, the measurement time can be shortened. In the context of a vehicle such as an aircraft, a measurement can be quickly provided after a change in acceleration.

Thanks to the present system, the IT means making it possible to process the signal can be simplified; including their computer program. In fact, the calculation necessary for filtering measurement errors is reduced since the cases of false detection remain limited.

In addition, the invention offers finer measurements. Indeed, the size of the submersible portion can form a reduced size location, for example less than 5 mm, so that the area; in this case the clearance; in which the liquid is detected is of reduced size.

DETAILED DESCRIPTION OF PREFERRED EMBODIMENTS

In the following description, the terms "internal" and "external" refer to a positioning relative to the axis of rotation of an axial turbomachine.

Figure 1:
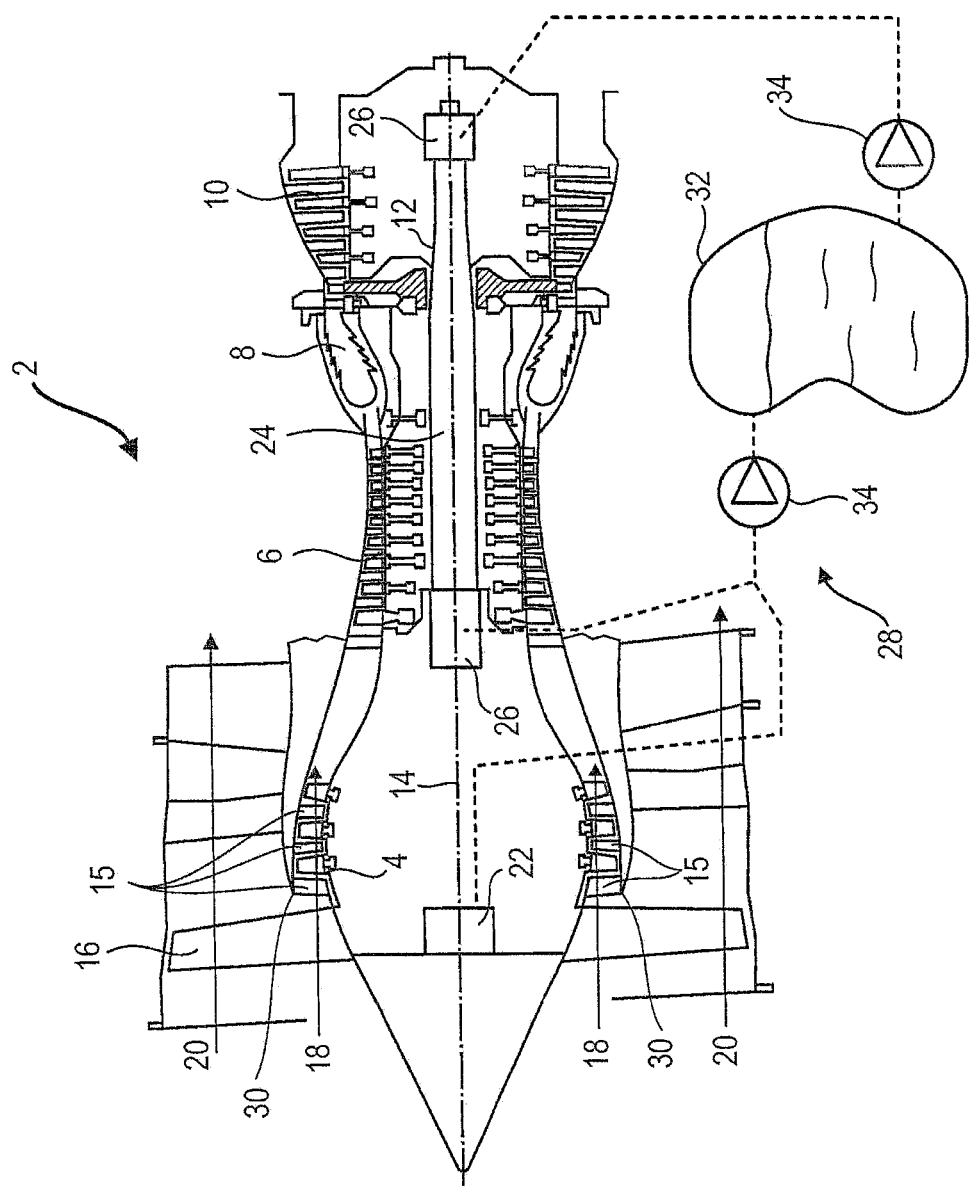
FIG. 1 represents an axial turbomachine according to the invention.

FIG. 1 shows a simplified axial turbomachine. In this specific case, it is a double-flow turbojet engine. The turbojet engine 2 comprises a first stage of compression, called a low-pressure compressor 4, a second stage of compression, called a high-pressure compressor 6, a combustion chamber 8 and one or more stages of turbines 10. In operation, the mechanical power of the turbines 10 transmitted via shafts to the rotor 12 sets in motion the two compressors 4 and 6. The latter comprise several rows of rotor blades associated with rows of stator blades 15. The rotation of the rotor around its axis of rotation 14 thus makes it possible to generate an air flow and to gradually compress it until it enters the combustion chamber 8.

An intake fan 16 is coupled to the rotor 12 and generates an air flow which is divided into a primary flow 18 passing through the various above-mentioned stages of the turbomachine, and a secondary flow 20 passing through an annular duct. The secondary flow 20 can be accelerated so as to generate a thrust used for the flight of an aircraft. Reduction means, such as a planetary reduction gear 22, can reduce the speed of rotation of the blower 16 and/or of the low-pressure compressor 4 relative to the associated turbine level 10.

The shafts 24 of the rotor 12 make it possible to mechanically connect each compressor (4; 6) to a dedicated turbine stage. In addition, a shaft 24 can be secured to the fan 16. The shafts 24 are articulated in rotation by means of bearings 26 supported by the stator of the turbomachine 2. Bearings 26 can be inserted between the shafts 24 that are fitted one into the other.

The cooling and/or lubrication of the bearings 26 and of the optional planetary reduction gear 22 are provided by a liquid circuit 28, such as a lubrication circuit. The liquid in question may in particular be oil. The lubrication circuit 28 can also be involved in de-icing the turbomachine, in particular an annular separation nozzle 30 at the inlet of the low-pressure compressor 4. The lubrication circuit 28 can also supply actuators such as jacks (not shown).

The lubrication circuit 28 can be specific to the turbomachine 2. It can be autonomous thanks to the presence of a dedicated tank 32. Thus, the circuit can operate in a closed circuit. Pumps 34 recovering or discharging the oil can be volumetric pumps, for example to control the flow rate. The oil circuit 28 can thus include several oil recovery lines converging on a tank 32. The tank 32 is also the starting point for several supply lines for the bearings 26 and the various pieces of equipment.

Also, the operation of the turbomachine 2 causes wear of the bearings 26 and of the pumps 34. This wear releases metallic particles in the lubrication circuit 28. These particles are also found in the oil of the tank 32, and can modify the properties of the oil. The tank for liquid can be of a heat exchanger.

Figure 2:
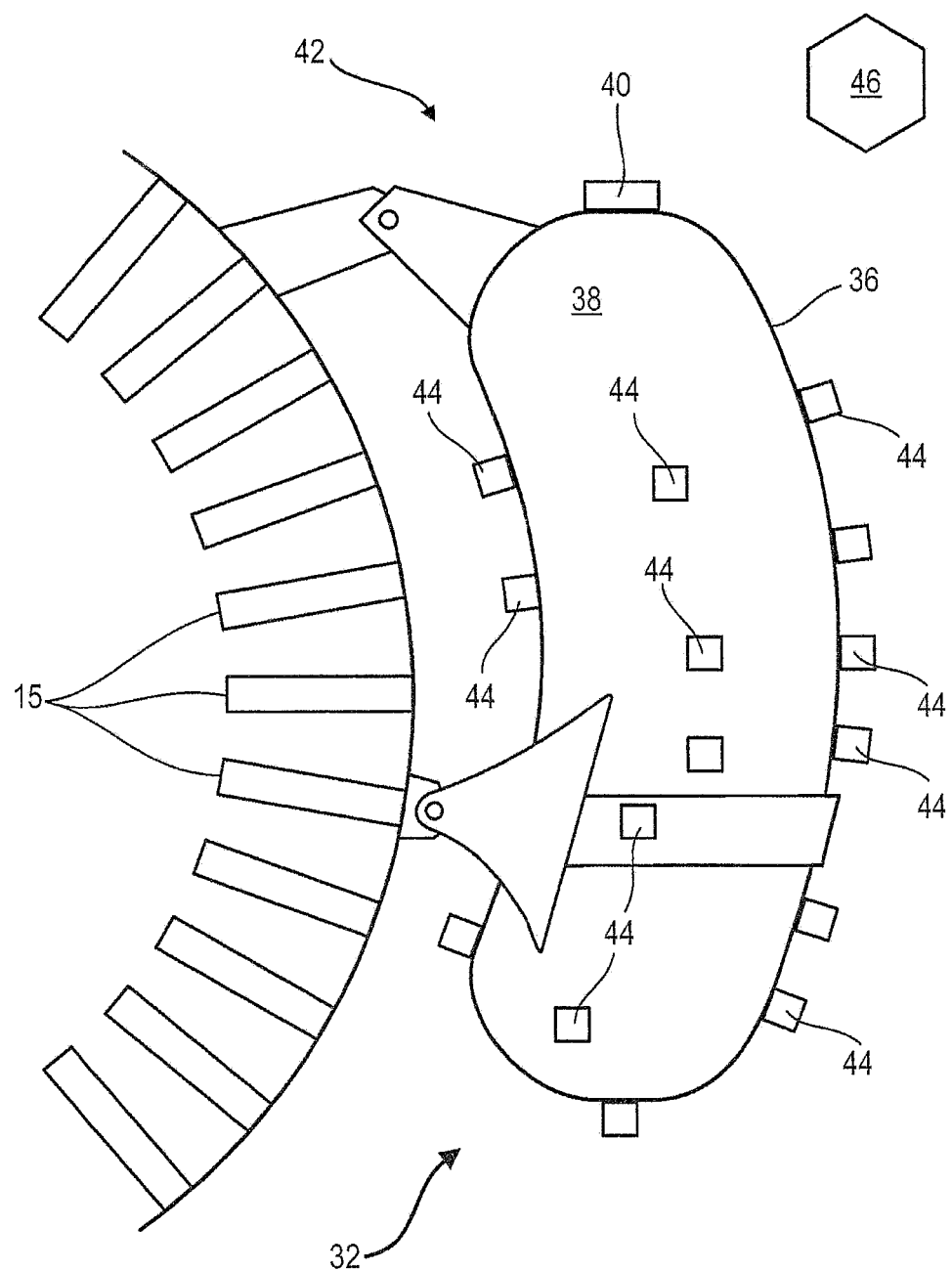
FIG. 2 illustrates a tank for liquid according to the invention.

FIG. 2 is a sectional view of an oil tank 32 such as that of FIG. 1.

The tank 32 can be fixed to the nacelle of the turbomachine 2, or to a compressor casing. In order to increase its useable volume, the tank 32 is essentially elongated while following a generally curved shape. This curvature allows its implementation between two curved and closely spaced walls. The tank 32 can in particular be near a hot source, its temperature can reach 100° C., in addition to being exposed to the vibrations of the turbomachine. The tank 32 can be fixed to the compressor casing also supporting stator vanes 15.

The tank 32 forms an essentially closed and sealed container. Its internal volume, that is to say its storage capacity, can be greater than or equal to: 20 L, or 50 L, or 70 L. The tank 32 has an outer wall 36, such as a skin or a shell. The external wall 36 can form the structure of the tank 32, and ensure its sealing. Its external surface 38 is visible. The top of the tank 32 can be identified by a plug 40, or by a vent (not shown).

The tank 32 includes a system 42 for measuring the level of liquid being stored there. The measurement system 42 comprises at least one or more measurement modules 44. The measurement modules 44 can be identical or similar to one another. The measurement modules 44 can be distributed vertically over the height of the tank 32; and/or distributed around the tank 32. The measurement system 42, via its measurement modules 44, makes it possible to estimate the quantity of oil. Each module can detect the presence of liquid at a given location against the external wall 36. A central unit 46, for example specific to the turbomachine or to an aircraft, can communicate with each module 44 in order to calculate the volume of liquid that is present in the tank 32. The central unit 46 can comprise computer means executing computer program code instructions making it possible to carry out a method of measuring the oil level on the basis of the information supplied by the modules 44. The central unit 46 can be configured to estimate the total volume of liquid contained in the cavity by triangulation from the measurements of modules 44.

For example, the method of calculation by triangulation can correspond to that disclosed in patent application BE2017/5865 filed on 29 Nov. 2017, where the at least three-point sensors correspond to the measurement modules 44 mentioned above.

Figure 3:
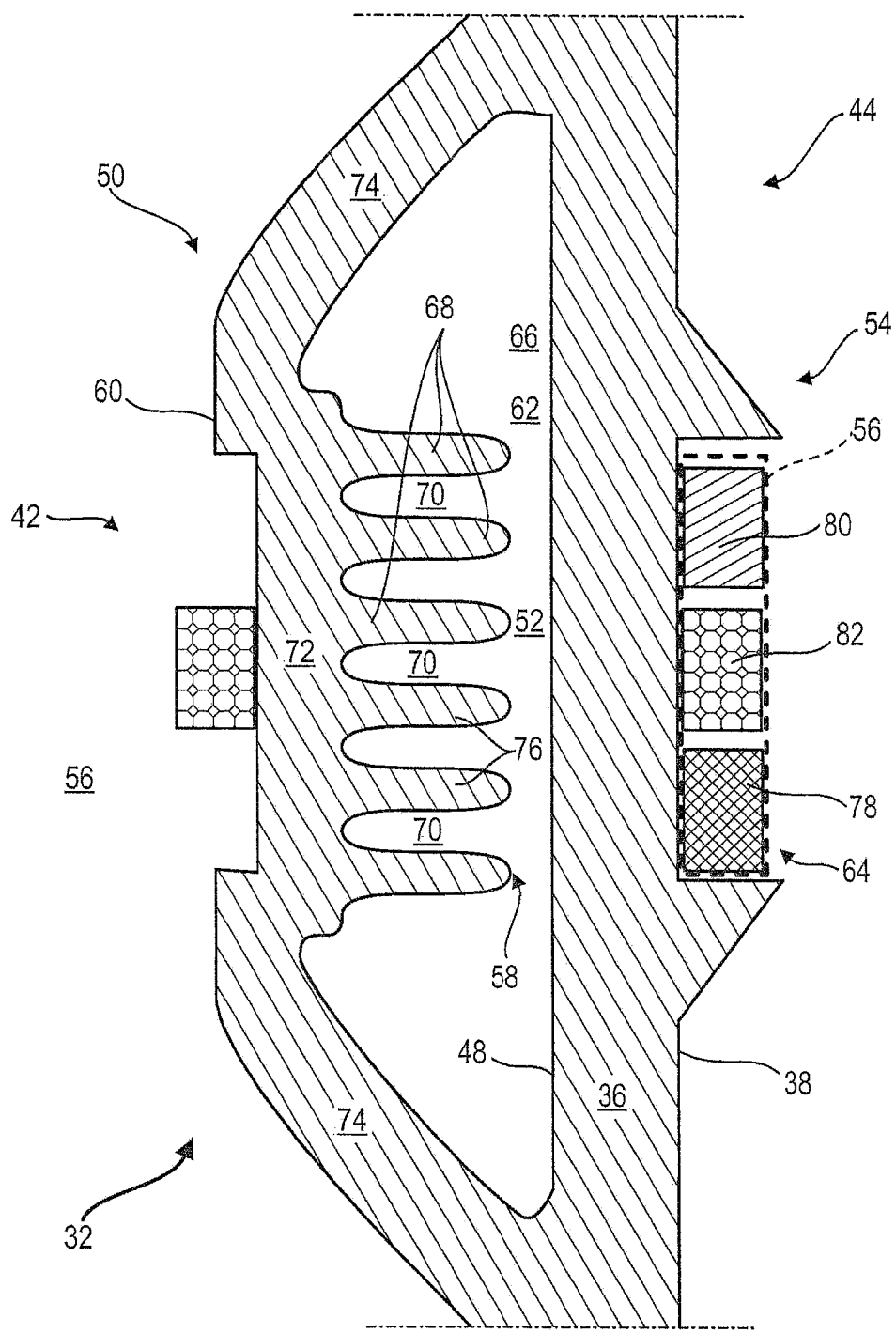
FIG. 3 sketches a liquid level measurement system according to the invention.

FIG. 3 sketches part of a measurement system 42 where one of the representative measurement modules 44 is apparent. The measurement system 42 may correspond to the one detailed in FIG. 2. A part of the outer wall 36 of the tank 32 is shown. Its external surface 38 carries the module 44. In a direction along the thickness of the wall 36, the internal surface 48 of the wall 36 is opposite the external surface 38.

From the inside to the outside of the tank 32, the measurement module 44 can successively comprise a submersible portion 50, a clearance 52 and a detector of liquid 54. These different entities are separated, so that the module 44 is astride and/or passes through the wall 36 along the direction of its thickness.

The submersible portion 50 may be inside the tank 32, in particular in its inner chamber 56 receiving the liquid. The submersible portion 50 is able to be in contact with the liquid when the liquid reaches the level of the submersible portion 50. It can then be embedded in the liquid, so that its entire surface is in contact with the liquid.

The submersible portion 50 may have an external side 58 facing the wall 36, and delimiting the clearance 52 in combination with the internal surface 48. The internal side 60 of the submersible portion 50 is turned towards the inside of the inner chamber 56, and is opposite to the external side 58. The submersible portion and the external wall may be integrally made. They can be produced by means of an additive manufacturing technology.

The clearance 52 can pass through the module 44. It can extend over the internal surface 48, and present an envelope which is complementary to the internal surface 48. It can form a separation blade between the submersible portion 50 and the wall 36. It can materialize an air gap. The clearance 52 can open on both sides to facilitate the entry and exit of the liquid when the level drops. At least one, or two opposite openings 62 allow a circulation of the liquid through the clearance 52, in order to allow a flow from and to the inner chamber 56.

The detector of liquid 54 is arranged outside the tank 32, for example against the external surface 38 of the wall 38. The latter may have a pocket 64, or a cavity, in which the detector of liquid 54 is arranged. The detector of liquid 54 is configured to emit a signal towards the submersible portion through the clearance. This signal has the particularity of being modified in the presence of liquid in the clearance 52, which proves a presence of liquid at the location of the clearance 52. The modification of the signal can take place during a travel through the clearance and/or during a reflected travel from the submersible portion 50.

The submersible portion 50 may have an area 66 close to the wall 36, also called an asperity area. The clearance 52 is delimited by said area, it can be delimited by the presence of roughness (68; 70). This clearance 52 can be a narrowing between the wall and the submersible portion 50.

The external side 58 can carry the asperities of the submersible portion 50. It can comprise a surface with bumps 68 extending towards the external wall 36 as well as recesses 70 communicating with the clearance 52 and digging towards the interior of the chamber 56. In this example, the recesses are separate and distinct from the clearance. The depth of the recesses 70 and the height of the bumps 68; in particular measured according to the direction of the thickness of the clearance 52; or according to the thickness of the wall 36 at the location of the submersible portion 50; or perpendicular to the internal surface 48; are larger than the width of the recesses and larger than the height of the recesses.

The submersible portion 50 can comprise a body 72 with two branches 74 in contact with the external wall 36. The body 74 can carry the area 66 and/or the external side 58. The branches 74 can keep the area 66 at a distance of the wall.

The submersible portion 50 can form a target for the detector of liquid 54. It can have a wave shape, or a comb shape. It can have a plurality of studs 76 forming the bumps 68. The studs can be distributed over the extent of the clearance 52. They can be arranged in a grid-like pattern (only one row being shown here).

The detector of liquid 54 may include an acoustic source 78 and a microphone 80. The acoustic source 78 is capable of emitting a sound signal, also called an acoustic signal, through the external wall 36. The signal propagates through the clearance 52 until it reaches the submersible portion 50 against which it is reflected, then returns to the microphone 80 by carrying out the reverse path.

When the clearance 52 is empty the signal is partially absorbed, and a reduced or zero portion of the signal returns to the microphone 80. In the presence of liquid, the acoustic conduction through the clearance 52 is improved, and the amplitude of the signal reaching the microphone 80 increases. Depending on whether the recesses 70 remain empty or filled with liquid, the portion of the signal that is reflected varies; whether the recess is empty or not.

In addition or as an alternative, the detector of liquid 54 may include an electrical voltage source 82 capable of applying a difference in electrical potential between the external wall 36 and the submersible portion 50. The signal can then be an electrical voltage making it possible to measure an electrical capacity through the clearance. The electrical potential can change depending on the presence of liquid there.

Figure 4:
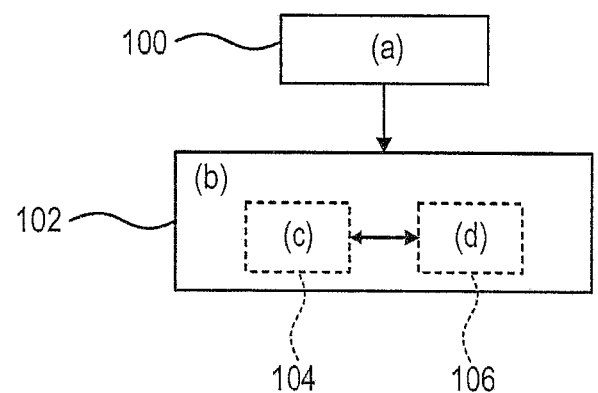
FIG. 4 is a diagram of a method for measuring the level of liquid according to the invention.

FIG. 4 represents a diagram of the method for measuring the level of liquid in a tank for liquid. The tank for liquid may be in accordance with that presented in connection with FIGS. 1 to 3, and the measurement system may be in accordance with that presented in connection with FIGS. 2 and 3.

The process can include one of the following steps, possibly carried out in the following order:
(a) filling 100 of the tank with the liquid;
(b) measure 102 of the liquid level in the tank via the level measurement system.

Between steps (a) filling 100 and (b) measure 102, a mechanism that is hydraulically connected to the tank can use the liquid, so that the tank is emptied. It is usually partially emptied; hence the need to control the level. The step (b) measurement 102 can comprise a step (c) generation 104 of a signal and a step (d) reception 106 of the signal transmitted in step (c) generation 104.

The step (d) reception 106 comprises reading and analyzing the signal, for example its acoustic intensity and/or its electrical capacity. Analysis of the frequencies received, other than the frequency or spectrum of the acoustic source, provides information on the filling of the recesses.

The invention claimed is:

1. A tank for containing liquid for an aircraft turbine engine, the tank comprising:
   an external wall with an internal surface and an external surface;
   an inner chamber for containing the liquid and delimited by the inner surface of the external wall; and
   a measurement system for measuring the level of liquid in the tank;
   wherein the measurement system comprises:
      a submersible portion along the internal surface of the external wall;
      a clearance separating the submersible portion from the internal surface; and
      a detector of liquid configured to emit a signal towards the submersible portion through the clearance, said signal being modified by the presence of liquid in the clearance.

2. The tank according to claim 1, wherein the submersible portion comprises:
   an external side facing the external wall and comprising:
      bumps protruding towards the external wall; and
      recesses in fluid communication with the clearance.

3. The tank according to claim 2, wherein the depth of the recesses and the height of the bumps, measured in the direction of the thickness of the clearance are greater than the width of the recesses and the width of the bumps.

4. The tank according to claim 1, wherein the clearance comprises:
   two opposite openings communicating with the inner chamber.

5. The tank according to claim 1, wherein the submersible portion comprises:
   a body with a first branch in contact with the external wall.

6. The tank according to claim 1, wherein the submersible portion comprises:
   studs arranged in a grid-like pattern and extending towards the internal surface of the external wall.

7. The tank according to claim 1, wherein the external wall and the submersible portion are made of metal and the clearance forms an air-gap between the external wall and the submersible portion.

8. The tank according to claim 1, wherein the detector of liquid comprises:
   an acoustic source; and
   a microphone;
   wherein the signal is a sound signal emitted by the acoustic source through the external wall towards the submersible portion, and the microphone is able to perceive through the external wall a reflected signal of the signal, after reflection against the portion submersible.

9. The tank according to claim 1, wherein the detector of liquid comprises:
   a source generating the signal and arranged outside of the external wall and against the external surface.

10. The tank according to claim 1, wherein the detector of liquid comprises:
    an electric voltage source applying a difference in electric potential between the external wall and the submersible portion, the signal being said difference in electrical potential.

11. The tank according to claim 1, wherein the detector of liquid is a capacitive detector configured to measure the electrical capacity of the clearance which is affected by the presence of liquid.

12. The tank according to claim 1, wherein the submersible portion and the external wall are integrally made.

13. The tank according to claim 1, wherein the detector of liquid, the clearance, and the submersible portion form a first module, the level measurement system further comprising:
    a plurality of modules similar to the first module.

14. An aircraft turbojet engine, comprising:
    a tank for containing a liquid, the tank comprising:
       an external wall with an internal surface and an external surface;
       an inner chamber for containing the liquid and delimited by the inner surface of the external wall; and
       a measurement system for measuring the level of liquid in the tank;
       wherein the measurement system comprises:
          a submersible portion along the internal surface of the external wall;
          a clearance separating the submersible portion from the internal surface; and
          a detector of liquid configured to emit a signal towards the submersible portion through the clearance, said signal being modified by the presence of liquid in the clearance;
    wherein the aircraft is configured to operate with negative vertical acceleration.

15. The aircraft according to claim 14, wherein the liquid is oil.

16. A method for measuring a level of liquid in an oil tank, the method comprising:
    (a) filling of the tank with the liquid;
    (b) measuring the level of the liquid in the tank with a level measuring system comprising:
       a submersible portion facing the internal surface of the external wall of the tank;

a clearance separating the submersible portion from the internal surface; and a detector of liquid;

wherein during the measuring step (b), the detector of liquid generates a signal through the clearance, respectively through the liquid in the presence of said liquid in the clearance, the signal being modified by the liquid when said signal crosses said clearance.

17. The method according to claim 16, further comprising:

providing a computer program including instructions, which, when the computer program is executed by a computer, lead the latter to implement the steps of the method.

* * * * *